US010949190B2

(12) United States Patent
Ramsay et al.

(10) Patent No.: US 10,949,190 B2
(45) Date of Patent: Mar. 16, 2021

(54) UPGRADEABLE COMPONENT DETECTION AND VALIDATION

(71) Applicant: Hewlett Packard Enterprise Development LP, Houston, TX (US)

(72) Inventors: James Ramsay, Westborough, MA (US); Adeel Saqib, Westborough, MA (US); Zhihao Tang, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/955,679

(22) Filed: Apr. 17, 2018

(65) Prior Publication Data

US 2019/0317750 A1 Oct. 17, 2019

(51) Int. Cl.
*G06F 8/65* (2018.01)
*G06F 9/455* (2018.01)
*G06F 9/54* (2006.01)

(52) U.S. Cl.
CPC ............ *G06F 8/65* (2013.01); *G06F 9/45558* (2013.01); *G06F 9/547* (2013.01); *G06F 2009/4557* (2013.01); *G06F 2009/45595* (2013.01)

(58) Field of Classification Search
CPC . G06F 9/547; G06F 9/548; G06F 8/65; G06F 8/654–658; G06F 8/66; G06F 8/60–66; G06F 11/3051; G06F 11/301; G06F 11/302; G06F 9/45558;
(Continued)

(56) References Cited

U.S. PATENT DOCUMENTS

| 6,966,058 B2 | 11/2005 | Earl et al. |
| 8,266,576 B2* | 9/2012 | Lam .......................... G06F 8/63 717/100 |
| 8,572,679 B1 | 10/2013 | Wang et al. |

(Continued)

OTHER PUBLICATIONS

"VMware vCenter Update Manager Administration Guide" 2010. VMware, Inc. vCenter Update Manager 4.0. pp. 67-72. (Year: 2010).*

(Continued)

*Primary Examiner* — Todd Aguilera
(74) *Attorney, Agent, or Firm* — Jaffery Watson Mendonsa & Hamilton

(57) ABSTRACT

The disclosure provides for systems and methods for performing upgrades in virtual environments. Some implementations are directed to using an upgrade service to provide pre-upgrade component detection and validation on host(s). A software package may be submitted to an existing software upgrade procedure of a host. The software package may include an upgrade executable that, when launched, provides a new software service, including initializing one or more new public-facing APIs to provide pre-upgrade host component detection and validation. Some implementations are directed to coordinating the upgrade of a first host using an upgrade service launched on another networked machine or second host. While running an upgrade service, the first host may make a request to the second host to coordinate the upgrade of components of the first host while the first host or a VM of the first host running the upgrade service is shut down.

19 Claims, 12 Drawing Sheets

(58) Field of Classification Search
CPC ... G06F 2009/45595; G06F 2009/4557; H04L 67/16; H04L 41/08–0896
See application file for complete search history.

(56) References Cited

U.S. PATENT DOCUMENTS

| | | | | |
|---|---|---|---|---|
| 8,875,124 | B2* | 10/2014 | Kuzmack | G06F 9/45558 717/173 |
| 9,032,053 | B2 | 5/2015 | Kosuru et al. | |
| 9,058,237 | B2 | 6/2015 | Chadalapaka et al. | |
| 9,170,852 | B2 | 10/2015 | Thompson et al. | |
| 9,459,856 | B2 | 10/2016 | Curzi et al. | |
| 9,785,427 | B2 | 10/2017 | Hu et al. | |
| 10,613,851 | B2* | 4/2020 | Ramsay | G06F 8/65 |
| 2007/0106978 | A1* | 5/2007 | Felts | G06F 8/71 717/124 |
| 2007/0124411 | A1 | 5/2007 | Dandekar et al. | |
| 2008/0034364 | A1* | 2/2008 | Lam | G06F 8/63 718/1 |
| 2012/0254865 | A1* | 10/2012 | Saeki | G06F 8/656 718/1 |
| 2013/0055155 | A1 | 2/2013 | Wong et al. | |
| 2013/0179872 | A1* | 7/2013 | Kuzmack | G06F 9/45558 717/173 |
| 2013/0232497 | A1 | 9/2013 | Jalagam et al. | |
| 2017/0371650 | A1 | 12/2017 | Li et al. | |
| 2018/0088932 | A1 | 3/2018 | Ouarraoui et al. | |
| 2019/0028331 | A1* | 1/2019 | Kovacheva | H04L 41/082 |

OTHER PUBLICATIONS

Fakhruddin, H., "External APIs vs. Internal APIs: Know the Difference", TeKnowledge [online], 2016 [retrieved May 26, 2020], Retrieved from Internet: <URL:https://teks.co.in/site/blog/external-apis-vs-internal-apis-know-the-differences/>, pp. 1-9.*
"IBM Pre-Upgrade Verification Tool for IBM i," Mar. 5, 2013, pp. 1-9, IBM.
"Mid Server Pre-upgrade Check," Nov. 16, 2017, pp. 1-5, ServiceNow.
Oracle, "Fusion Middleware Upgrading with the Upgrade Assistant," 2015, pp. 1-25 [online], Retrieved from the Internet on Feb. 8, 2018 at URL: <docs.oracle.com/middleware/1221/core/UAREF/GUID-7A27CBC2-GBB7-4E1C-BDD4-6DEACCQ7FF29.htm#UAREF861>.
European Search Report and Search Opinion Received for EP Application No. 19169693.9, dated Sep. 10, 2019, 9 pages.
Wikipedia, "Application Programming Interface", Apr. 14, 2018, 9 pages.
Ca, "Install a Cluster Node for the Domain Orchestrator," Nov. 9, 2017, pp. 1-2 [online], Retrieved from the Internet on Mar. 9, 2018 at URL: <docops.ca.com/ca-process-automation/4-2-2/en/installing/install-and-configure/install-a-cluster-node-for-the-domain-orchestrator>.

* cited by examiner

UPGRADEABLE COMPONENT DETECTION AND VALIDATION

DESCRIPTION OF THE RELATED ART

Computer systems and clusters of computer systems utilized by enterprises may employ hardware virtualization. Hardware virtualization generally refers to the creation and use of virtual machines (VM) and the like that emulate computer systems with operating systems. Common advantages of hardware virtualization include greater overall hardware-resource utilization, improved system scalability, and simplifying/centralizing administrative management of the system.

Data centers are one type of system that can use virtualization to realize these advantages. Some data center systems virtualize storage, computing, and networking resources. Such systems are sometimes referred to as hyper-converged systems. In such systems, a cluster of nodes or servers may share resources among various VMs running on the nodes.

BRIEF SUMMARY OF THE DISCLOSURE

Implementations disclosed herein are directed to systems and methods for performing upgrades in virtual environments.

In a first set of embodiments, systems and methods described herein are directed to providing pre-upgrade component detection and validation on one or more hosts.

In implementations of the first set of embodiments, a non-transitory computer-readable medium may store executable instructions that, when executed by one or more processors, perform a method including the steps of: launching an instance of an upgrade service on a host; the upgrade service initializing one or more APIs that provide access to a component detection subsystem and a validation subsystem; using at least the component detection subsystem to determine and return a list of components that are upgradeable on the host; receive user input selecting one or more of the listed upgradeable components; and using at least the validation subsystem to perform compatibility testing of the selected components prior to upgrading the selected components on the host. The upgrade service may be launched on a VM (e.g., virtual controller) of the host.

In implementations, initializing the one or more APIs may include: the launched upgrade service initializing an interface that registers itself into a HTTP or HTTPS web server of the VM with a new uniform resource identifier (URI) name space.

In implementations, using at least the component detection subsystem to determine and return a list of components that are upgradeable on the host, may include one or more of the following: (i) contacting one or more internal APIs of the VM to determine a current version of the VM; and comparing the current version of the VM with a version of the VM available for upgrade; (ii) contacting a hypervisor running the VM to determine a current version of the hypervisor; and comparing the current version of the hypervisor with a version of the hypervisor available for upgrade; and (iii) contacting a baseboard management controller (BMC) of the host to determine a current BIOS version or firmware version of the host; and comparing the current version of the BIOS or firmware with a version of the BIOS or firmware available for upgrade.

In implementations, using at least the validation subsystem to perform compatibility testing of the selected components prior to upgrading the selected components on the host, may include: for each of the selected components, testing the compatibility of the selected component with existing host software, host hardware, or another one of the selected components; and returning a validation test result for each of the selected components based on compatibility test of the selected component.

In implementations, the method may further include: launching a second instance of the upgrade service on a VM of a second host; using at least the component detection subsystem to determine and return a list of components that are upgradeable on the second host; receive user input selecting one or more of the listed upgradeable components of the second host, where the user input selecting one or more of the listed upgradeable components of the second host is received in parallel to the user input selecting one or more of the listed upgradeable components of the first host; and using at least the validation subsystem to perform compatibility testing of the selected upgradeable components of the second host prior to upgrading the selected components on the second host.

In implementations, the returned list of components that are upgradeable on the first host and the returned list of components that are upgradeable on the second host may be aggregated into a list and presented for selection to the user on a user interface. The aggregated list may display a current version of each of the upgradeable components of the first and second hosts, and a upgrade version available for each of the upgradeable components of the first and second hosts.

In implementations, the method may further include: aggregating validation test results received from each of the hosts based on the compatibility testing of the selected upgradeable components of each of the hosts; and presenting the aggregated validation test results on a user interface to the user. In some instances, the presented aggregated validation test results may present instructions for mitigating or correcting issues associated with a validation test result that failed or generated a warning.

In a second set of embodiments, systems and methods described herein are directed to coordinating the upgrade of a first host using an upgrade service launched on another networked machine or second host that communicates with the first host.

In implementations of the second set of embodiments, a non-transitory computer-readable medium may store executable instructions that, when executed by one or more processors, perform a method including the steps of: launching an upgrade service on a host; using at least the launched upgrade service to select one or more components of the host that are to be upgraded; after selecting the one or more components of the host that are to be upgraded, making a request at the host to an upgrade service launched on another networked machine to upgrade the one or more selected components of the host while the host is powered off or while a VM of the host is powered off; coordinating at the upgrade service launched on another networked machine, the upgrade of the one or more selected components; and validating at the host, the upgrade of the one or more selected components. In these implementations, the upgrade service may be launched on a VM (e.g., a virtual controller) that makes the request to the upgrade service launched on another networked machine, the coordination of the upgrade may occur after the VM is powered off, and the VM may validate the upgrade after it powers on.

In implementations, the method further includes: the upgrade service of the host updating the storage stack software prior to making the request at the VM to upgrade the one or more selected components of the host while the VM is powered off.

In implementations, the another networked machine is a peer host. In these implementations, making the request at the VM of the host may include: making a request for an upgrade service launched on a VM of the peer host to upgrade the one or more selected components.

In some implementations, the host may launch the upgrade service on the another networked machine prior to making the request. In some implementations, the VM of the host may make a request for the VM of a peer host to launch the upgrade service.

In implementations, the one or more selected components may include one or more of: the VM of the host, a hypervisor that runs the VM of the host, and a BIOS or firmware.

In implementations, coordinating the upgrade of the one or more selected components may include: waiting for the VM to power off; adjusting one or more parameters of the powered off VM; upgrading one more of: (i) a hypervisor that runs the VM, and (ii) a BIOS or firmware of the host; and rebooting the host after adjusting the one or more parameters of the powered off VM and upgrading the one or more of: (i) the hypervisor that runs the host, and (ii) the BIOS or firmware of the host. In implementations, coordinating the upgrade of the one or more selected components may include: powering back on the VM after performing the aforementioned steps.

In some implementations, the method may further include: after validating the upgrade, the host signaling a second host running an instance of the upgrade service to upgrade components of the second host.

In some implementations of the second set of embodiments, a non-transitory computer-readable medium may store executable instructions that, when executed by one or more processors, perform a method including the steps of: launching an instance of an upgrade service on a VM of a first host of a set of hosts of a cluster; using at least the launched instance of the upgrade service to select one or more components of the first host to be upgraded; making a request at the VM of the first host to an instance of the upgrade service launched on a VM of another host of the set of hosts to upgrade the one or more selected components of the first host while the VM of the first host is powered off; coordinating at the instance of the upgrade service launched on the VM of the another host, the upgrade of the one or more selected components of the first host; and validating, at the VM of the first host, the upgrade of the one or more selected components of the first host.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

Figure 1:
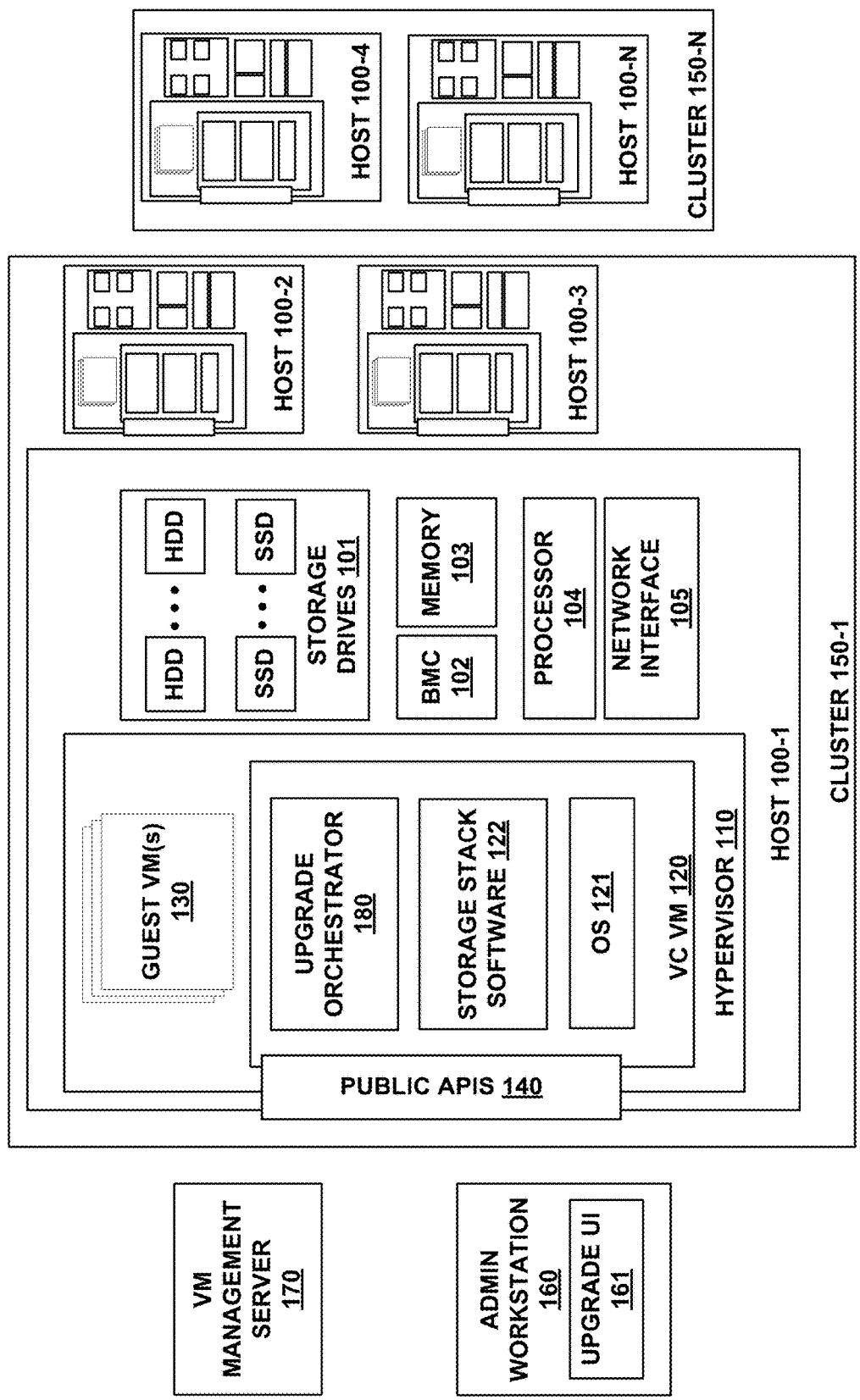
FIG. 1 is a schematic block diagram illustrating an example data virtualization system in which the technology described herein may be implemented.

The figures are not intended to be exhaustive or to limit various embodiments to the precise form disclosed. It should be understood that various embodiments can be practiced with modification and alteration.

DETAILED DESCRIPTION

As noted above, virtualization of storage, computing, and networking resources may provide various advantages to systems such as data centers. However, such systems may present issues when it comes time to update the virtualized environment, including the various virtualized platforms and/or computing systems that are virtualized by the system along with the firmware used to control the hardware of hosts running the virtualized platforms and/or systems.

A first issue in conventional virtualization systems is that they do not presently provide a reliable and robust method for pre-validating an upgrade before a user/administrator of the system invests a substantial amount of time with the upgrade process for one or more hosts. In particular, such systems do not provide a mechanism for executing detection and pre-upgrade validation logic on hosts running in a cluster to determine what host components may require an upgrade. Moreover, there is no mechanism in such systems for determining if the upgrade of those host components is expected to succeed. For example, in some present implementations of software storage stack upgrades in hyperconverged data center systems, the only feedback a system administrator may receive during the upgrade process is a notification that an upgrade failed. Such feedback does not provide a means for the system administrator to attempt to address the causes of the failure before contacting a customer support representative. Additionally, it adds the inconvenience of having downtime for hosts on which the upgrade was executed.

In one current implementation of upgrade clients that run on such systems, an upgrade client may query externally-facing application programming interfaces (APIs) that exist on a running version of storage stack software to determine whether an upgrade was allowed. However, having an upgrade client query existing externally-facing APIs presents a number of disadvantages. It forces business logic to be deeply embedded in upgrade client software, which may be restrictive and architecturally improper. Additionally, the set of information exposed via external APIs may be sufficient to make some, but not all of the component availability and environment validation checks required. Such an implementation is not sufficient to plan for future enhancements such as hypervisor software updates, server firmware updates, dedicated VM upgrades, and other upgrades that may be implemented in these systems. It may be difficult, if not impossible, to use existing APIs to query the state of existing software components that were previously not able to be upgraded in an automated fashion, since the specific details of how new versions are packaged and what details are needed from a running system may not have been known at the time of a previous software release.

Another issue in virtualization systems relates to the upgrade of VMs running resource allocation software for guest VMs. In a hyperconverged data center environment, a software stack running inside a VM may invoke code from the host's BIOS, the host's firmware, a hypervisor that runs the VM, and from the contents of the VM itself. Upgrading any area outside of the VM contents itself (e.g., the VM's container, the hypervisor, the host's BIOS/firmware, etc.) can typically only be performed while the VM (and sometimes the hypervisor) is powered off. For instance, a hypervisor upgrade will often require a hard reboot of the hypervisor and the VM running within it. A BIOS or host firmware upgrade may necessitate a reboot of the host itself. Even adjusting parameters in the container metadata or configuration of the VM may require the VM to be shut down. In all these examples, the VM cannot perform the required upgrade steps.

This is problematic for a few reasons. First, as upgrade logic cannot run on the VM while it is powered off, the VM may not be able to report the status of the upgrade to the user/administrator running the upgrade. This in turn makes it harder for the user to track the upgrade and perform error recovery. Second, this requires the upgrading user to manually upgrade components of the host that would result in a shutdown of the VM (e.g., the hypervisor running the VM, the host firmware/BIOS, etc.). This manual upgrading process many necessitate several independent operations that shut down the VM dedicated to running resource allocation, which may increase host downtime.

Embodiments of the technology described herein are directed to addressing these and other issues that arise during the process of updating virtual environments.

In accordance with a first set of embodiments, the technology described herein is directed to an upgrade service (referred to herein as an "upgrade orchestrator") that is configured to provide pre-upgrade component detection and validation on one or more hosts (e.g., one or more hosts running on a cluster). In accordance with implementations, the upgrade orchestrator may be implemented as a software package that can be submitted to an existing software upgrade procedure of a host. The software package may include an upgrade executable that, when launched, provides a new software service, including initializing one or more new public-facing APIs to provide pre-upgrade host component detection and validation. In accordance with some implementations, an instance of the upgrade orchestrator may be launched on a plurality of hosts, and it may be configured to allow for an upgrade service to perform the functions of host component detection and validation in parallel on multiple hosts.

In accordance with a second set of embodiments, the technology described is directed to coordinating the upgrade of a first host using an upgrade orchestrator launched on another networked machine or second host that communicates with the first host. For example, the another networked machine may be a second host running on the same cluster as the first host. The first host may initialize an upgrade process by running an upgrade orchestrator of its own, and during that process, the first host may make a request to the second host to coordinate the upgrade of components of the first host (e.g., hypervisor, VM container, host firmware/BIOS) while the first host or a VM of the first host running the upgrade orchestrator is shut down.

Before describing implementations of the upgrade orchestrators described herein, it is instructive to describe an example data virtualization system in which they may be implemented. FIG. 1 is a schematic block diagram illustrating one such example. The data virtualization system includes a plurality of host machines or hosts 100-1 to 100-N (referred to as "hosts 100") grouped into clusters 150-1 and 150-2 (referred to as "clusters 150") that share host resources (e.g., computing and memory resources) that may be allocated to running VMs.

Each host 100 may be implemented as a physical server (e.g., a server having an x86 or x64 architecture) or other suitable computing device. Each host 100 can provide computing and memory resources that may be allocated to VMs 120, 130 and/or shared with other hosts 100 in cluster 150. For example, a cluster 150 may include two hosts 100 that are implemented as x86 servers having 64 GB of memory and two CPUs running at 10 GHz. Cluster 150 may have an aggregate of 128 GB of memory and 20 GHz of computing power that may be allocated to running VMs 120, 130 on hosts 100 therein. During operation of a cluster 150, the resources allocated to VMs 120, 130 running on one or more hosts 100 in the cluster 150 may be dynamically adjusted depending on the needs of the hosts. In implementations, resource pools may be partitioned and assigned to one or more VMs 120, 130 within the hosts in any suitable manner (e.g., based on an enterprise's departmental needs).

The data virtualization system of FIG. 1 may be implemented as a hyperconverged data center that provides functions such as data deduplication, data compression, data optimization, data backup, data restore, data cloning, data management, etc. For instance, VM data may be written simultaneously to two hosts 100 within cluster 150 to provide a failover mechanism for restarting VMs of a failed host and/or providing a VM data backup. As another example, VM data may be moved from one host to another host.

Although the data virtualization system of FIG. 1 embodies a multi-cluster system, in other implementations, the technology described herein may be implemented in systems having a single cluster of hosts. Additionally, although each cluster 150 in this example is illustrated as having multiple hosts 100, in other implementations, the technology described herein may be implemented in clusters 150 having single hosts 100. In some implementations, the technology described herein may be implemented in individual hosts 100 that are not part of a (shared resource) cluster.

Each host 100 may include a hypervisor 110 and hardware components such as one or more of storage drives 101 (e.g., a RAID storage having a number of hard disk drives (HDD) and/or solid state drives (SSD)), baseboard management controller (BMC) 102, memory 103 (e.g., RAM, ROM, flash, etc.), one or more processors 104, and a network interface 105 to communicate over a network (e.g., with other hosts or with the Internet over a TCP/IP network).

Hypervisor 110 may be configured to create and/or run one or more guest VMs 130 and virtual controller VM 120 (referred to herein as "VC VM" or "VC"). Hypervisor 110 may be implemented as software (e.g., machine readable instructions executable by a processing resource), firmware, and/or hardware. In particular implementations, hypervisor 110 may be implemented as VMWARE ESX/ESXi, XEN, HYPER-V, or some other suitable hypervisor for creating and running VMs.

In this example system, VC 120 is a VM configured to run storage stack software 122. Software 122 may be used to perform functions such as managing access by VMs 130 to storage drives 101, providing dynamic resource sharing, moving VM data between storage drives 101, providing data movement, and/or performing any of the aforementioned hyperconverged data center functions. These functions may be performed with respect to VMs 130 currently running on the host 100 and/or all VMs 130 running on hosts belonging to the same cluster 150. In implementations, VC 120 may be dedicated to its respective host 100 (e.g., it does not share its resource pool with other hosts). In particular implementations, VC 120 may be implemented using HPE OmniStack®.

In the example system of FIG. 1, a VM management server 170 may provide a centralized management application to connect to and manage hosts 100 (e.g., provision resources), including hosted VMs 130, and for performing other related functions. The centralized management application may provide a graphical user interface (GUI) that allows a user to manage software upgrades for individual nodes, clusters of nodes, or all nodes. In particular implementations, VM management server 170 may be implemented with vCenter® or SCVMM®. In the system illustrated by FIG. 1, admin workstation 160 may access VM management server 170 to connect to and manage hosts 100. In other implementations (e.g., in implementations having only a few VMs/single hosts), an admin workstation 160 may directly connect to and manage host(s) and VM(s) without a VM management server.

Figure 2:
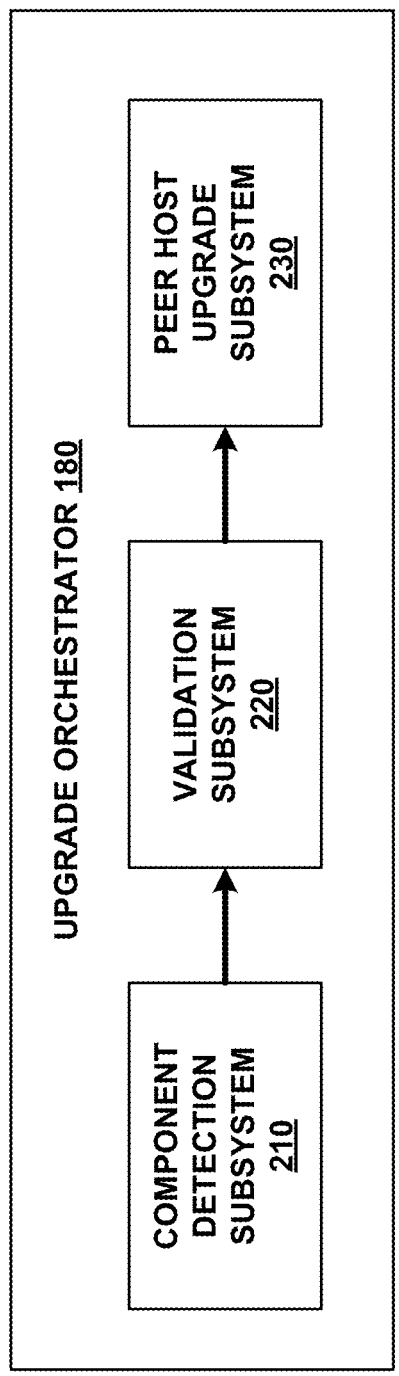
FIG. 2 is a block diagram illustrating example subsystems of an upgrade orchestrator in accordance with implementations.

During an upgrade of hosts 100, a software package including an executable of an upgrade orchestrator 180 may be uploaded to a VC VM 120 of the host. As illustrated by FIG. 2, the upgrade orchestrator 180 may include a component detection subsystem 210 to provide pre-upgrade detection of upgradeable components on a host, and a pre-upgrade validation subsystem 220 to validate the upgradeable components detected by component detection subsystem 210. Upgrade orchestrator 180 may also include a peer host upgrade subsystem 230 to coordinate the upgrade of certain components of a peer host while the peer host's VC 120 is powered off. In some instances, upgrade orchestrator 180 may be implemented as one or more containers that include the components necessary (e.g., executables, files, environment variables and libraries, etc.) to implement the aforementioned functionalities.

Upgrade orchestrator 180 is illustrated in FIG. 2 as including subsystems for providing component detection, component validation, and peer upgrade coordination. However, in alternative implementations, separate upgrade orchestrators may be uploaded to a host to provide the functionalities of i) pre-upgrade component detection and validation; and ii) peer host upgrade coordination. It should be appreciated that the functions of pre-upgrade component detection and validation, and peer host upgrade coordination, may be implemented independently of one another in some implementations.

In some implementations, the upgrade orchestrator 180, when initialized, may attach to a namespace of a web server of VC 120 and initialize one or more public facing APIs 140, further described below, that can provide services such as pre-upgrade component detection and validation of the host. Additionally, the upgrade orchestrator may be configured to coordinate the upgrade process on another peer host on the same cluster, and provide other services such as updating the storage stack software 122. During the upgrade process, a user may use upgrade UI 161 to interact with upgrade orchestrator 180, and dynamically view pre-upgrade or upgrade results.

Figure 3:
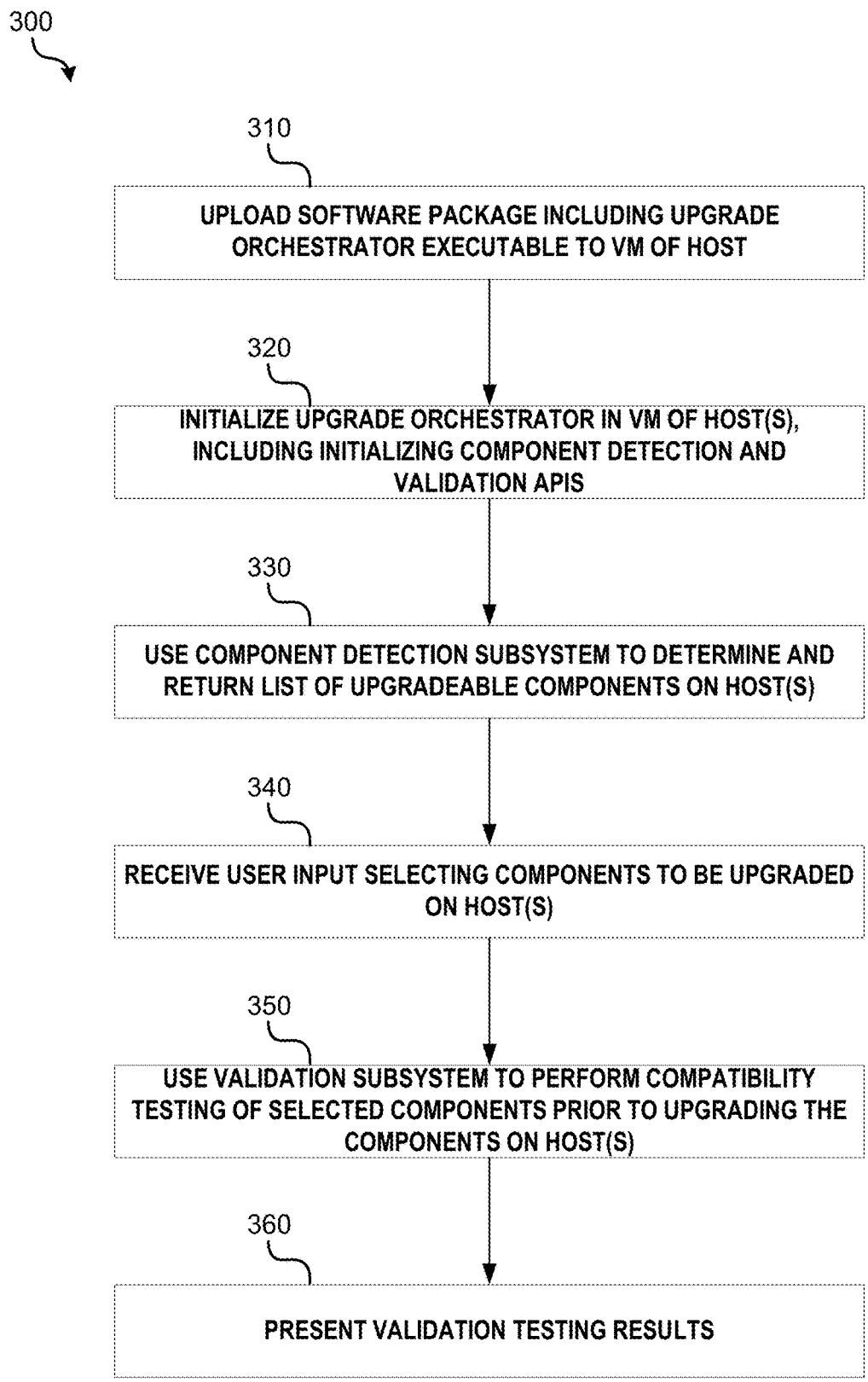
FIG. 3 is an operational flow diagram illustrating an example method that may be implemented on one or more hosts to provide pre-upgrade component detection and validation, in accordance with implementations.

FIG. 3 is an operational flow diagram illustrating an example method 300 that may be implemented on one or more hosts to provide pre-upgrade component detection and validation, in accordance with implementations. For example, method 300 may be implemented by uploading and launching an upgrade orchestrator 180 on a VC 120 of a host 100.

At operation 310, a software package including an upgrade orchestrator executable may be uploaded to a VM running on a host. For example, an admin workstation 160 may upload the software package to a VC 120 running on a hypervisor 110 of the host. In implementations, the software package may be uploaded to the VC 120 using the same mechanism that it used for an existing software upgrade procedure of the VC.

At operation 320, the upgrade orchestrator may be initialized (e.g., by running the executable). When initialized, the upgrade orchestrator may initialize a pre-upgrade component detection API and a pre-upgrade validation API that may respectively provide access to a component detection subsystem and a pre-upgrade validation subsystem. In some implementations, this may be accomplished by the upgrade orchestrator initializing a new Representational State Transfer (REST) service that registers itself into a HTTP or HTTPS web server of the VM with a new uniform resource identifier (URI) name space. This new interface may provide access to the component detection and validation APIs, which in some implementations may be generic and extensible to allow for future addition of further component types and validation checks as new versions of host components are developed in the future.

In other implementations, the upgrade orchestrator may itself comprise an embedded HTTP web server that may provide externally facing APIs without attaching to an existing HTTP/HTTPs webserver of the VM.

In some implementations, when the upgrade orchestrator is initialized on a host belonging to a cluster, an instance of it may be initialized on all other hosts belonging to that cluster. For example, an instance of the upgrade orchestrator may be initialized on a VC of all hosts of a cluster to initialize a pre-upgrade component detection API and pre-upgrade validation API.

At operation 330, a component detection subsystem (e.g., one accessed by the component detection API) may be used to determine and return a list of upgradeable components of the host(s). The component detection subsystem may be configured to return a list of all components of a host that may be upgraded, and for each one, include a current state and/or current version of the component, as well as a list of available new versions that it may be upgraded to. For example, the component detection subsystem may determine if new versions of a hypervisor, a VC, host firmware/BIOS, and/or other host components are upgradeable to a new version. The versions of the components available for upgrade may be determined by consuming metadata included in the software package including the upgrade orchestrator.

By virtue of the component detection subsystem, upgradable components can be determined without resorting to externally-facing APIs. In some implementations, the component detection subsystem may contact one or more internal APIs of the VM to determine a current version of the VM; and compare the current version of the VM with a version of the VM available for upgrade. In some implementations, the component detection subsystem may contact a hypervisor running the VM to determine a current version of the hypervisor; and compare the current version of the hypervisor with a version of the hypervisor available for upgrade. In some implementations, the component detection subsystem may contact a baseboard management controller (BMC) of the host to determine a current BIOS version or firmware version of the host.

In some implementations, the list returned by the component detection subsystem may be empty (e.g., no upgrades available). In some implementations, the list returned by the component detection subsystem may provide multiple choices for an upgrade of a given component (e.g., a user may have the option of upgrading version 6.0 of a hypervisor to any one of versions 6.1 through 6.5).

At operation 340, the upgrade orchestrator may receive user input (e.g., through an upgrade GUI 161) selecting upgradeable components that are to be upgraded on the host(s). Depending on system needs, the user may select all upgradeable components, a subset of upgradeable components, or no components to be upgraded.

At operation 350, a validation subsystem (e.g., one accessed by the validation API) may be used to perform compatibility testing of the selected components prior to upgrading the components on the host(s). In implementations, each test may relate to the compatibility of the existing hardware and software to the selected component(s), compatibility of the selected components to each other, compatibility of the selected components to other external factors (e.g., like a VM management server), or other external environmental factors.

In particular implementations, validations may "skip" (if not applicable), "pass" (in which case the upgrade is expected to succeed), "warn" (in which case the upgrade is expected to succeed but with reduced features or performance, unless user action mitigates the related issues), or "fail" (in which case the upgrade is expected to fail unless user action mitigates the related issues).

At operation 360, the validation testing results may be presented to the user. In implementations where one or more validations fail or generate a warning (e.g., "warn" or "fail"), the testing results may return instructions to the user on how the user may mitigate the issue and rerun the validations, so that the user may address all known issues before beginning the upgrade.

Figure 4:
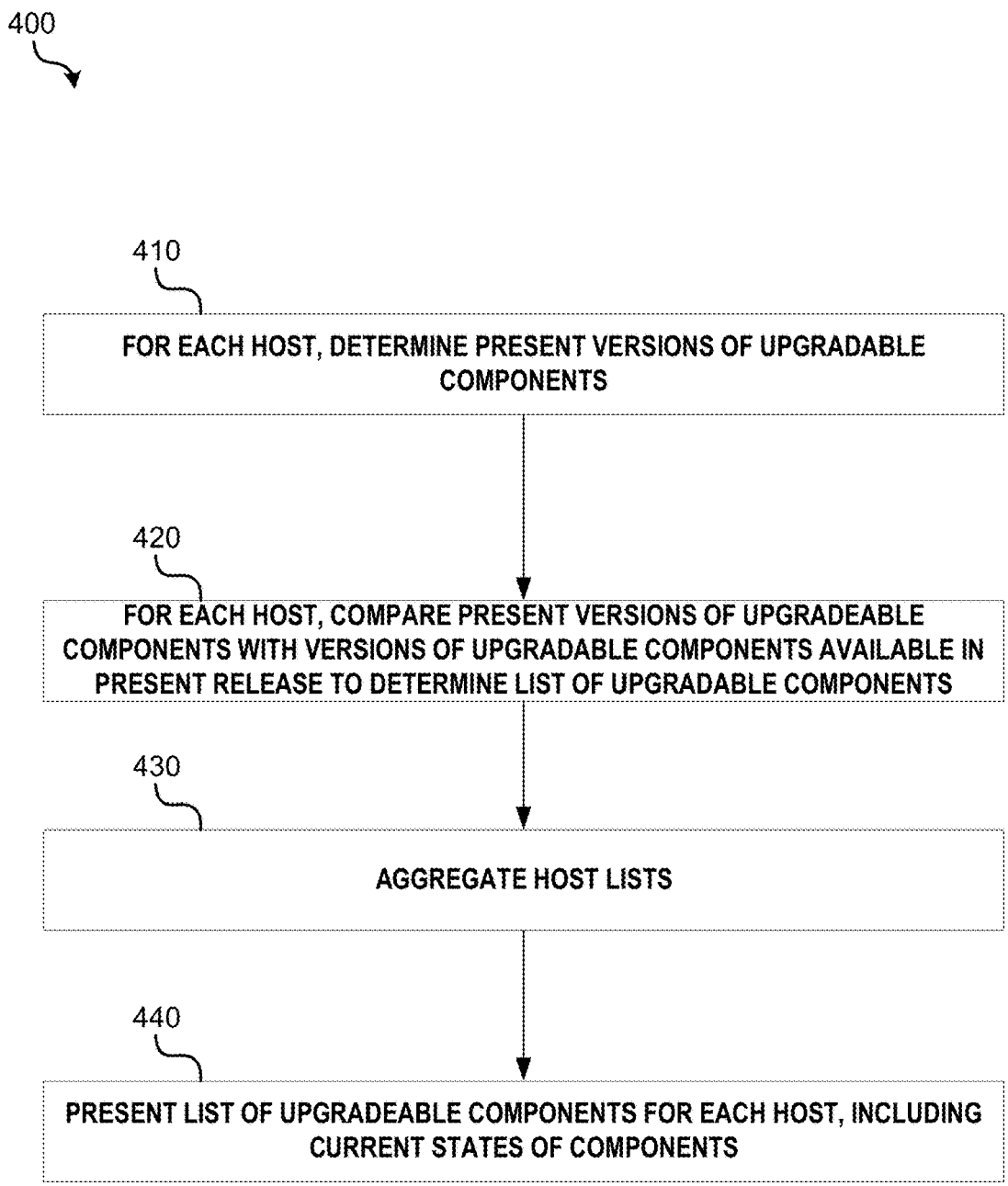
FIG. 4 is an operational flow diagram illustrating an example method that may be implemented on a cluster of hosts in parallel to provide pre-upgrade component detection on the hosts for presentation to a user.

FIG. 4 is an operational flow diagram illustrating an example method 400 that may be implemented on a cluster of hosts in parallel to provide pre-upgrade component detection on the hosts for presentation to a user. For example, method 400 may be implemented by running multiple instances of an upgrade orchestrator in parallel on the hosts (e.g., in a VC of each host). At operation 410, for each host, the present versions of upgradeable components may be determined. At operation 420, for each host, present versions of upgradeable components may be compared with versions of upgradable components available in a present software release to determine a list of upgradable components for each host. The host lists may then be aggregated (operation 430) and presented to the user (operation 440). For example, the aggregated host list may be presented in an expandable/collapsible tree format that includes the current states of all upgradeable components of each host, and the versions that those upgradeable components may upgrade to.

Figure 5:
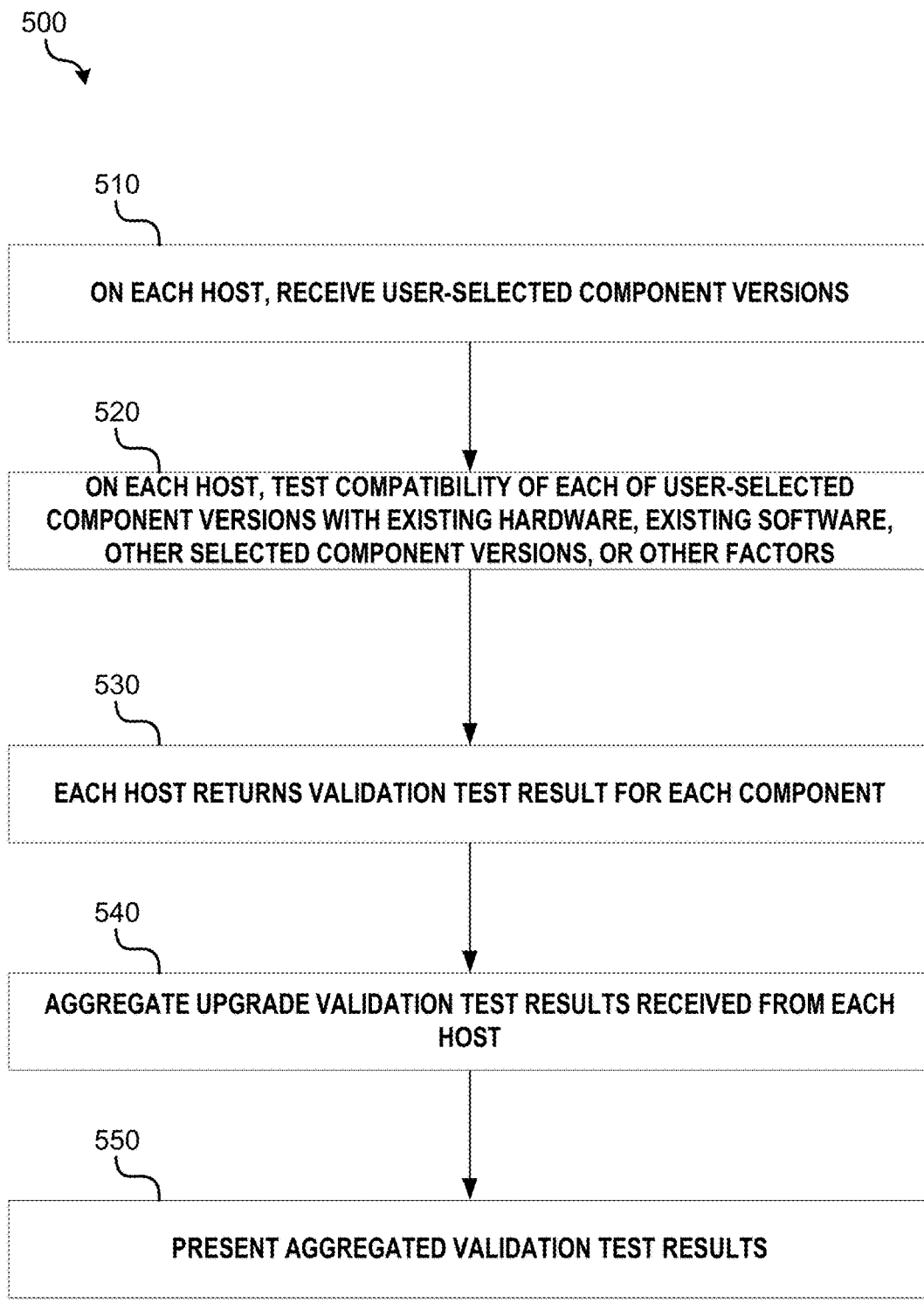
FIG. 5 is an operational flow diagram illustrating an example method that may be implemented on a cluster of hosts in parallel to provide pre-upgrade validation of detected upgradeable components for presentation to a user.

FIG. 5 is an operational flow diagram illustrating an example method 500 that may be implemented on a cluster of hosts in parallel to provide pre-upgrade validation of detected upgradeable components for presentation to a user. For example, method 500 may be implemented by running multiple instances of an upgrade orchestrator in parallel on the hosts (e.g., after method 400). At operation 510, each host may receive user-selected component versions that are to be upgraded prior to validation (e.g., as described above with reference to operation 340). At operation 520, the compatibility of each of the user-selected component versions may be compared with existing hardware, existing software, other selected component versions, or other factors. At operation 530, each host may return validation test results for each component. At operation 540, the validation test results received from each host may be aggregated. At operation 550, the aggregated validation test results may be presented to the user on a UI (e.g., an upgrade UI 161). For example, the aggregated validation test results may be presented in an expandable/collapsible tree format.

Figure 6:
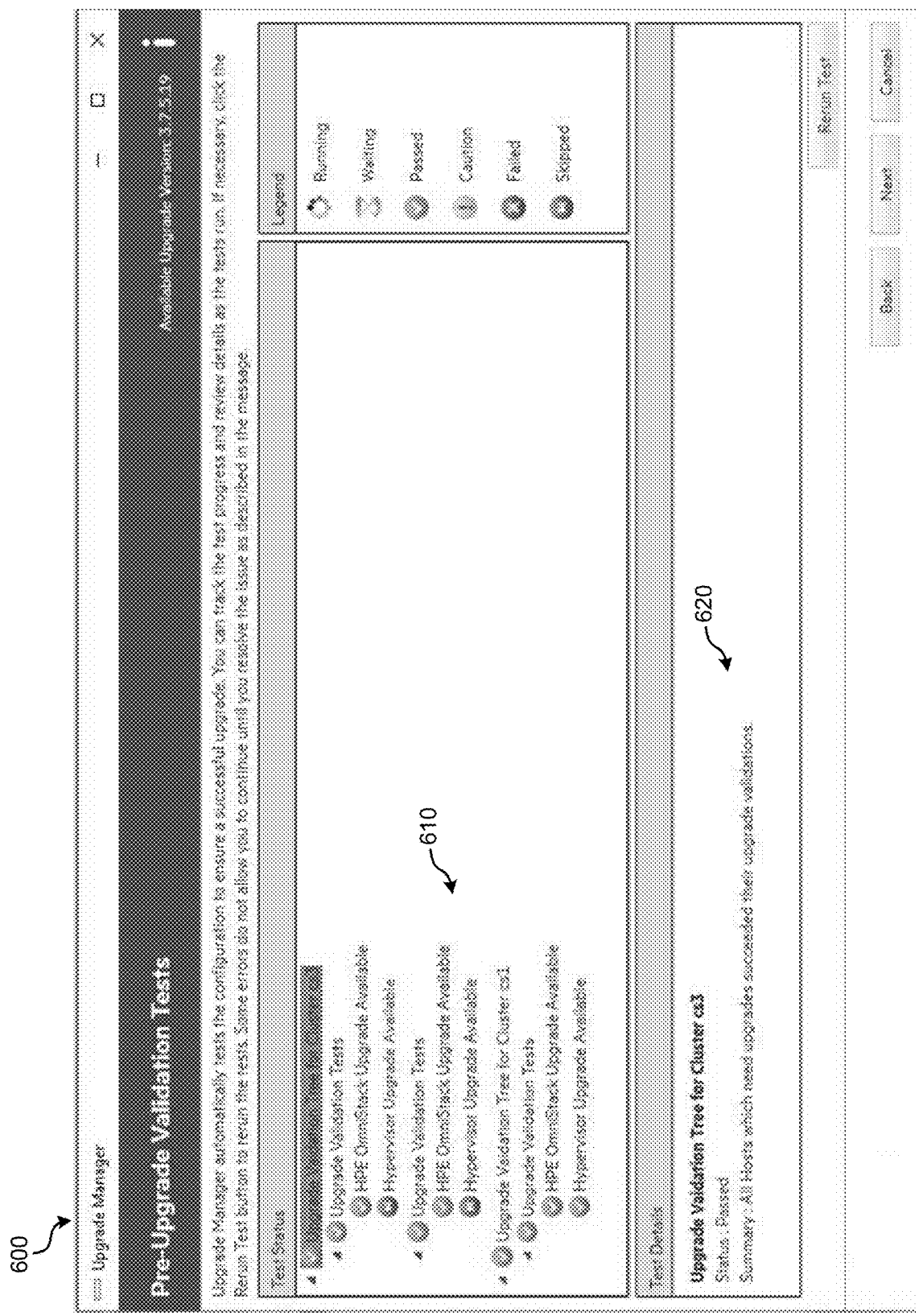
FIG. 6 illustrates a GUI that may be presented to a user for implementing pre-upgrade component detection and validation on multiple clusters of hosts, in accordance with implementations.

FIG. 6 illustrates an example GUI 600 that may be presented to a user for implementing pre-upgrade component detection and validation on multiple clusters of hosts, in accordance with implementations. In this example, GUI 600 is displaying results after completing component detection and validation. As illustrated, GUI 600 may display an expandable/collapsible tree of results 610, including test details 620 for a result selected from the tree of results 610. In the case of a problematic result (e.g., warning or fail), the test details 620 may include instructions to the user regarding how the user may mitigate the issue and rerun the validations, so that the user may address all known issues before beginning the upgrade.

Figure 7:
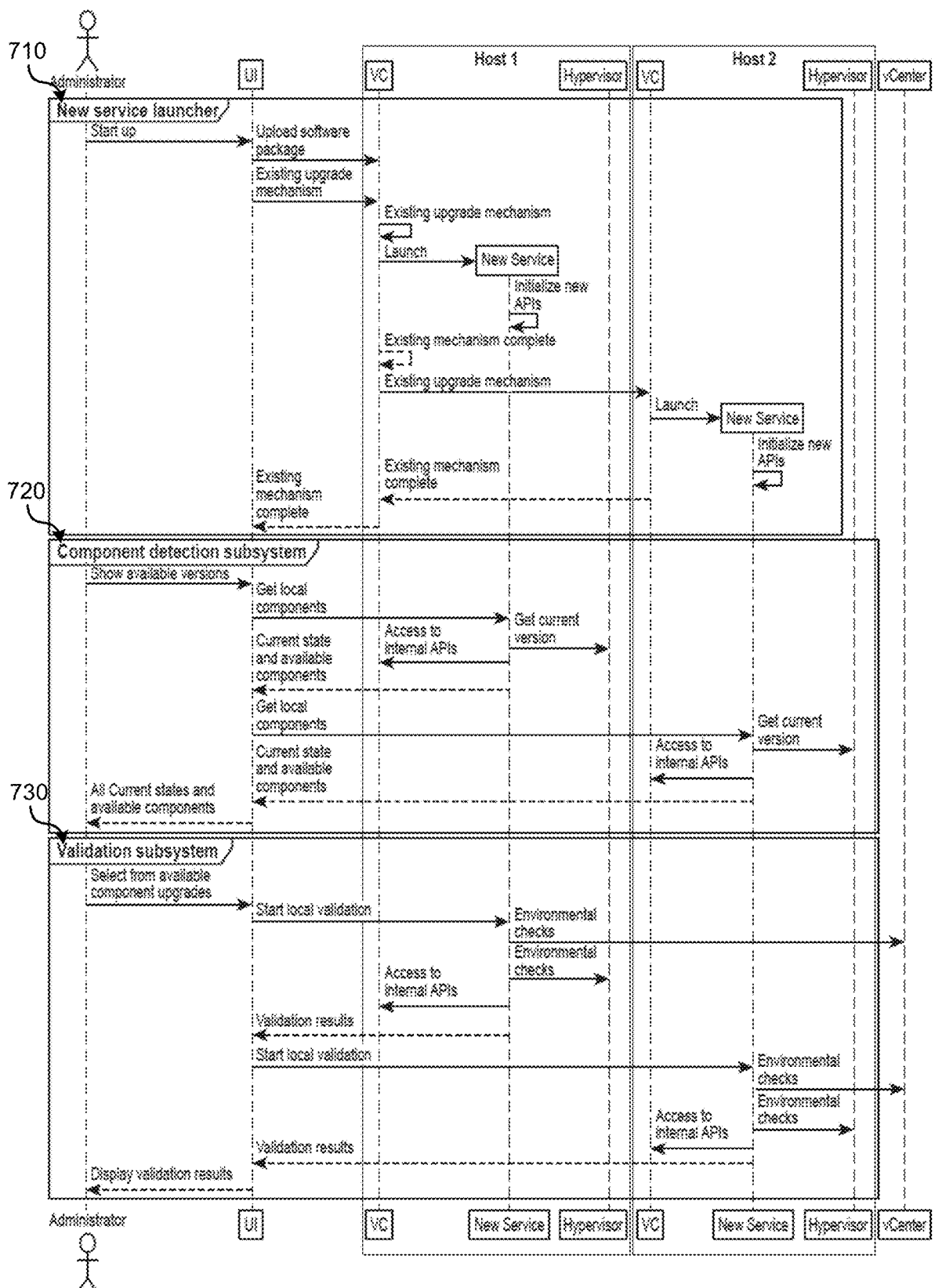
FIG. 7 is a sequence diagram illustrating a particular example method that may be implemented on a cluster of two hosts to initialize an upgrade orchestrator and provide pre-upgrade component detection and validation, in accordance with implementations.

FIG. 7 is a sequence diagram illustrating a particular example method that may be implemented on a cluster of two hosts to initialize an upgrade orchestrator, and provide pre-upgrade component detection and validation in accordance with implementations. In the example of FIG. 7, the UI may be implemented as UI 161 of admin workstation 160, the VC of each host may be implemented as VC 120, the hypervisor of each host may be implemented as hypervisor 110, and the vCenter may be implemented on a VM management server 170.

As illustrated, the method of FIG. 7 may be implemented using a new service launcher 710, a component detection subsystem 720, and a validation subsystem 730. For example, service launcher 710 may be configured to perform operations corresponding to operations 310-320, component detection subsystem 720 may be configured to perform operations corresponding to operation 330, and validation subsystem 730 may be configured to perform operations corresponding to operations 340-360.

With reference to new service launcher 710, a system administrator may communicate with Hosts 1 and 2 (e.g., hosts 100) through an upgrade UI (e.g., upgrade UI 161). Through the UI, the system administrator may upload a software package to a VC of Host 1. The uploaded software package may include an upgrade orchestrator (referred to in this diagram as a "new service"). Afterward, the system administrator may exercise an existing software upgrade mechanism on each host that causes a new upgrade service to launch on each host. Upon launching, the new service may initialize new APIs, including a component detection API and validation API.

With reference to component detection subsystem 720, after initialization of the new service on each host, the UI may begin communicating with the new APIs initialized on each local orchestrator (new service), which may communicate directly with the local VC (e.g., by accessing internal APIs) and the local hypervisor, to return the current states and available components for upgrade. For example, the component detection subsystem may return a software stack version of each VC, a hypervisor version of each VC, etc.

With reference to validation subsystem 730, the system administrator may select from available component upgrades that were presented by the component detection subsystem. Once the system administrator has decided what actions to take based on the available choices presented by the component detection subsystem, those choices may be submitted back to the local upgrade orchestrator of each host. This can initiate local validation, including communicating with each local VC to access internal APIs, communicating with the local hypervisor to perform environmental checks, and communicating with a VM management server to perform environmental checks. The validation results from each of the hosts are aggregated and displayed to the system administrator.

Figure 8:
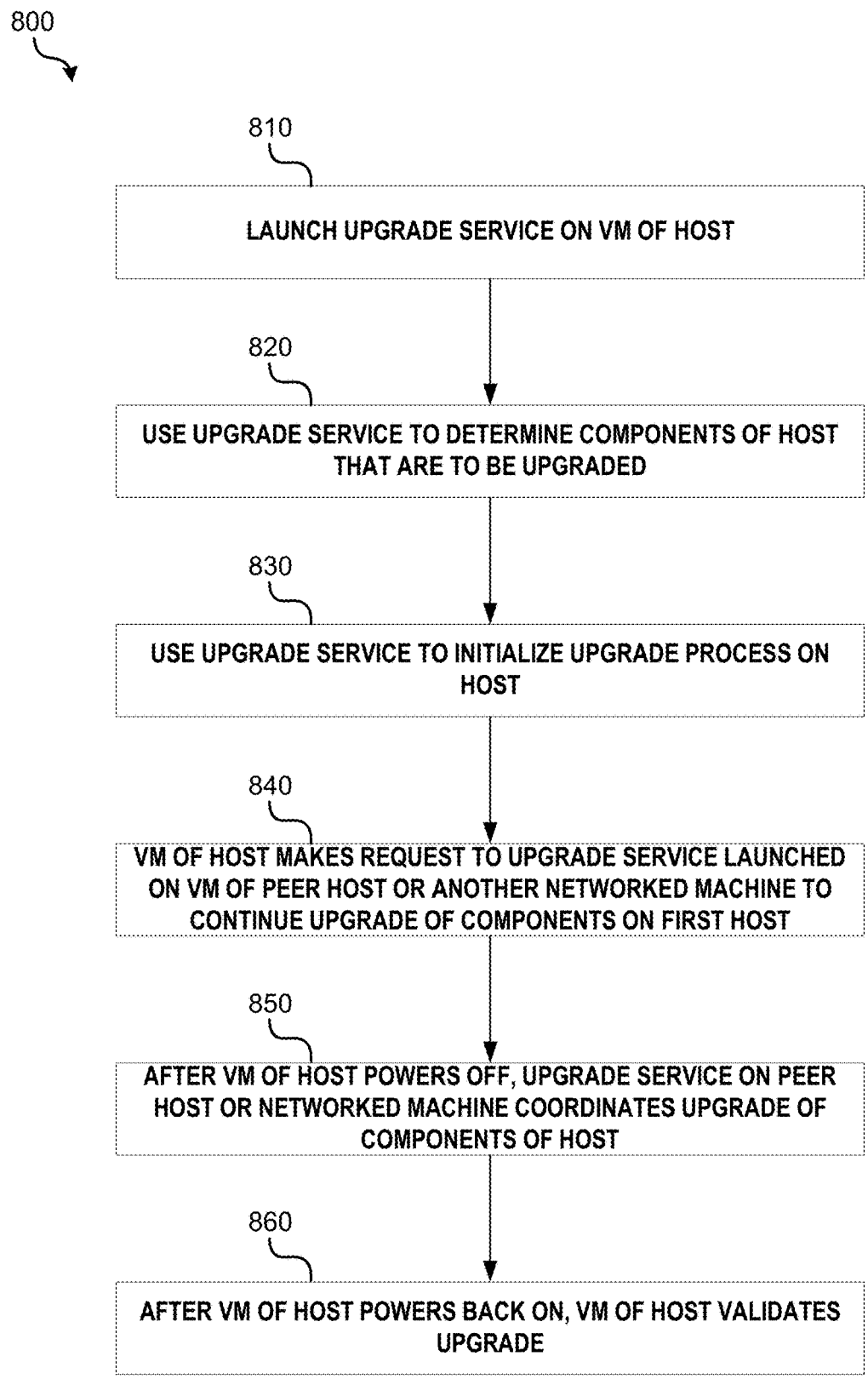
FIG. 8 is an operational flow diagram illustrating an example method that may be implemented to coordinate the upgrade of a first host using an upgrade orchestrator launched on another networked machine.

FIG. 8 is an operational flow diagram illustrating an example method 800 that may be implemented to coordinate the upgrade of a first host using an upgrade orchestrator launched on another networked machine. For example, method 800 may be implemented by uploading and launching an upgrade orchestrator 180 on multiple hosts 100 and/or by launching an upgrade orchestrator 180 on a host 100 and an admin workstation 160.

At operation 810, an upgrade service is launched on a VM of a host to be upgraded. For example, an upgrade orchestrator 180 may be launched on a VC 120 of a host 100 as described above with reference to FIG. 3. Alternatively, the upgrade service may be launched on host 100? using some other mechanism (e.g., manually running an install executable on a host).

At operation 820, the launched upgrade service may be used to determine components of the host that are to be upgraded. In one implementation, the one or more components to be upgraded may be determined by implementing a pre-upgrade component detection and validation method 300 as discussed above. In alternative implementations, the one or more components to be upgraded may be received as user input from a user (e.g., system administrator) of the upgrade service. Additionally still, the one or more components to be upgraded may be predetermined (e.g., where the upgrade service always updates the same components with the same versions).

At operation 830, the launched upgrade service may be used to initialize an upgrade process on the host. For instance, in the example environment of FIG. 1, the launched upgrade service may begin an upgrade of storage stack software 122. In implementations where the host is part of a multi-cluster environment (e.g., FIG. 1), one or more of operations 810-830 may be performed in parallel or sequentially for the plurality of hosts of the cluster.

As the upgrade process proceeds on the host, the upgrade may reach a point where the VM may need to be powered off and/or the host may need to be rebooted (e.g., to complete the upgrade). As such, at operation 840, the VM of the host being upgraded makes a request to an upgrade service launched on a VM of a peer host (e.g., a host on same cluster) or another networked machine (e.g., admin workstation, VM management server, etc.) to continue upgrading components on the host being upgraded. In implementations, this request may communicate the components of the host that require upgrading (e.g., VM, hypervisor, host BIOS/firmware, etc.)

In implementations where the VM of the host being upgraded makes a request to an upgrade service launched on a VM of a peer host, the upgrade service of the peer host may already be running. Alternatively, the VM of the host being upgraded may launch the upgrade service of the peer host on demand upon being requested by the host being upgraded. In some implementations, the VM of the host being upgraded may transmit an instance of the upgrade service to the peer host prior to launching it on the peer host.

In implementations where the host is not part of a cluster or is a member of a single member cluster, it may reach out to an external networked machine (e.g., admin workstation) to coordinate/orchestrate the upgrade. In such implementations, an instance of the upgrade service may be manually started on the external networked machine, and the host being upgraded may notify the externally-running upgrade service of the steps that need orchestrating/coordinating.

At operation 850, after the VM of the host powers off, the upgrade service on the peer host or networked machine coordinates the upgrade of components of the host. For example, the upgrade service on the peer host or networked machine may adjust one or more parameters of the powered off VM, upgrade a hypervisor that runs the VM, update a BIOS or firmware of the host, and/or reboot the host.

At operation 860, after the VM of the host powers back on, the VM may resume the upgrade as originally designed, validating that the upgrade steps performed by the peer host or another networked machine were completed successfully.

Figure 9:
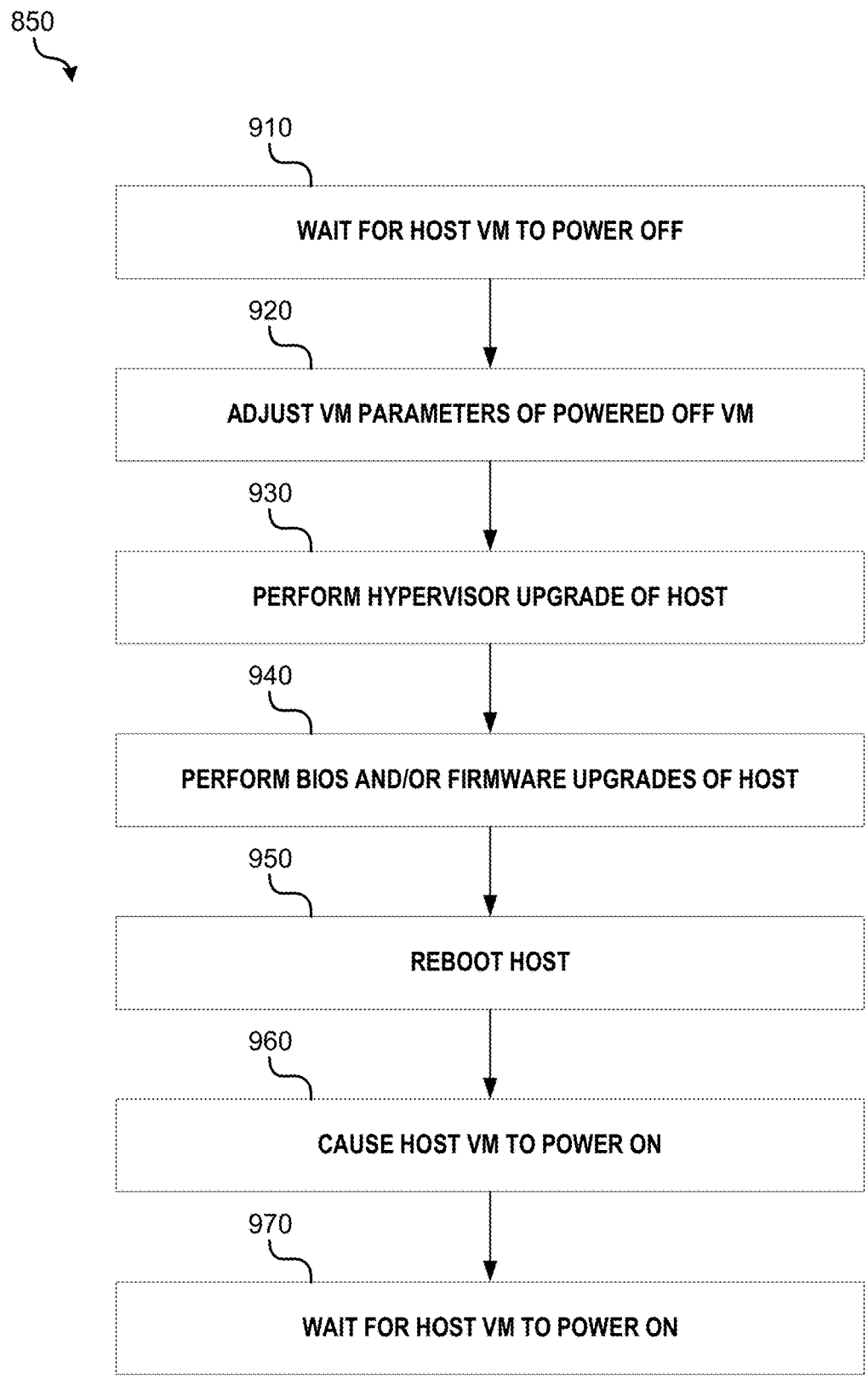
FIG. 9 is an operational flow diagram illustrating an example method that may be implemented by an upgrade orchestrator running on a networked machine connected to a host (e.g., a peer host) to coordinate an upgrade of components of the host, in accordance with implementations.

FIG. 9 is an operational flow diagram illustrating an example method 900 that may be implemented by an upgrade orchestrator running on a networked machine connected to a host (e.g., a peer host) to coordinate an upgrade of components of the host. For example, method 900 may be a particular implementation of operation 850.

At operation 910, the networked machine may wait for the VM of the host being upgraded to power off. In implementations, the networked machine may communicate with a VM management server 170 to determine when the host powered off. Once the VM powers off, at operation 920, the networked machine may adjust VM parameters of the powered-off VM. For example, the networked machine may adjust parameters such as an amount of memory or CPU processing power assigned to a VC.

At operation 930, the networked machine may upgrade a hypervisor of the host (e.g., a hypervisor that runs the VM). For example, the networked machine may place the hypervisor into maintenance mode, perform any necessary upgrades of the hypervisor, and exit maintenance mode to return the hypervisor to an active mode. In implementations where the host is part of a cluster (e.g., cluster 150), when the hypervisor is placed in maintenance mode, guest VM(s) of the host (e.g., guest VM(s) 130) may be migrated to other hosts in the cluster or temporarily powered off. In these implementations, the hypervisor may perform the operations of powering off the VMs and/or migrating them to other hosts. Alternatively, in some implementations, the upgrade service may include machine readable instructions for performing these operations (e.g., if the hypervisor does not support this function at the time).

At operation 940, the networked machine may perform BIOS and/or firmware upgrades of the host. At operation 950, the networked machine may cause the host to be rebooted (e.g., to complete the BIOS/firmware upgrades and/or the hypervisor upgrade). At operation 960, the networked machine may cause the rebooted host's VM to power back on. In one implementation, this may be done by placing the host back in an active mode, which may cause the hypervisor to reboot all VMs (e.g., return to a running state VMs that were powered off when the host went into maintenance mode). At operation 970, the networked machine may wait for the host to power on, and the upgrade process may be completed and validated by the host.

As illustrated by method 900, by virtue of a networked machine (e.g., peer host) orchestrating multiple upgrades of the host in a single workflow, only one host reboot (e.g., operation 950) may need to be completed. Otherwise, if the upgrades were performed manually and separately, operations such as the hypervisor upgrade (operation 930) and BIOS/firmware upgrades (operation 940) may each require their own reboot. This may reduce the overall downtime and cost of the upgrade.

It should be noted that while method 900 has been described in the context of a networked machine that orchestrates the upgrade of a host's VM, hypervisor, and BIOS/firmware, in some implementations, the networked machine may only need to orchestrate the upgrade of a subset of these components (e.g., depending on the components that were selected for upgrade by the host). Additionally, in some implementations the networked machine may orchestrate the upgrade of other software, firmware, and/or hardware components of the host.

Figure 10:
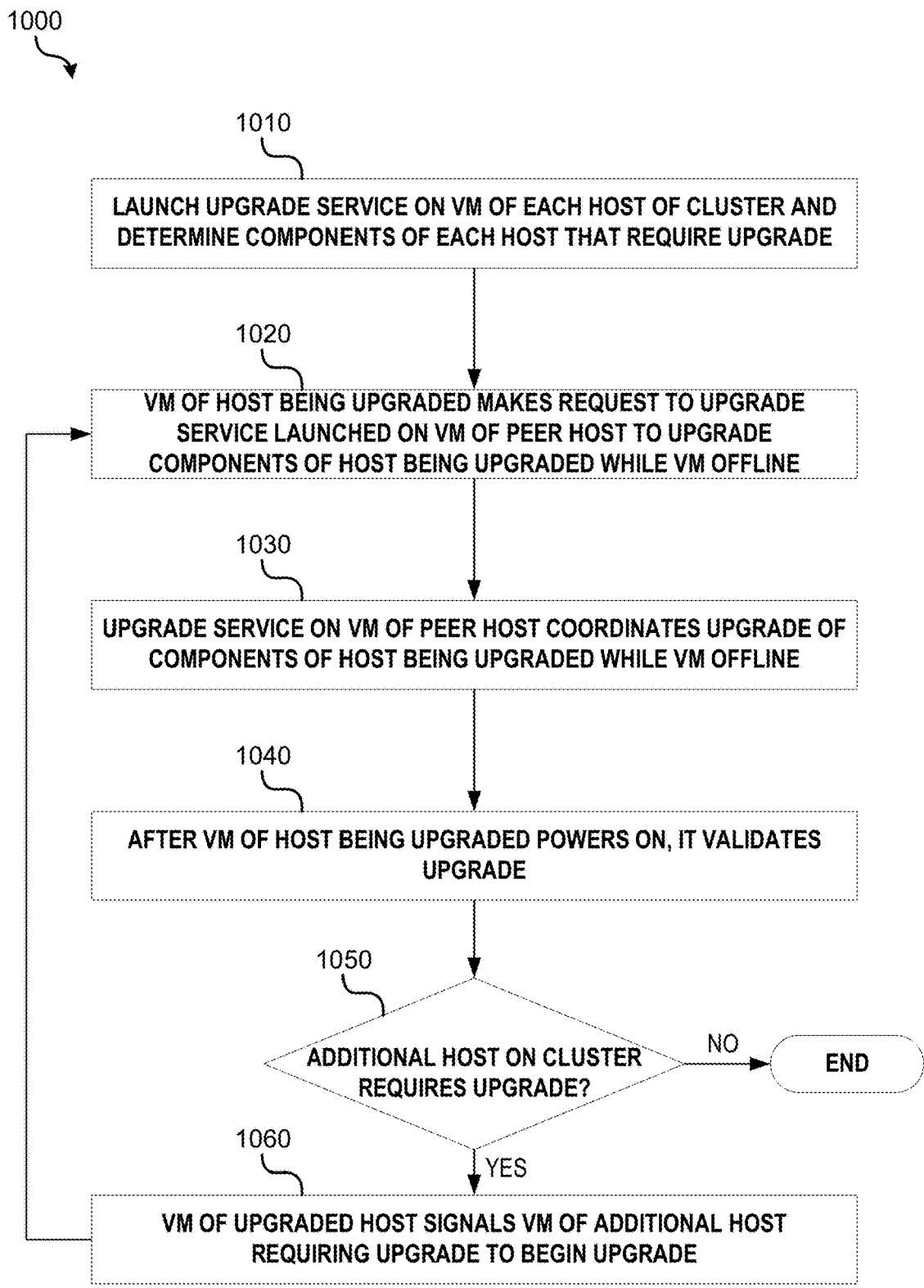
FIG. 10 is an operational flow diagram illustrating an example method that may be implemented in a multi-host cluster to upgrade the hosts of the cluster by using peer hosts to coordinate the upgrade of host whose VM is turned off, in accordance with implementations.

FIG. 10 is an operational flow diagram illustrating an example method 1000 that may be implemented in a multi-host cluster to upgrade the hosts of the cluster by using peer hosts to coordinate the upgrade of host whose VM is turned off. At operation 1010, an instance of an upgrade service may be launched on a VM of each host of a cluster, and the components of each host to be upgraded may be determined. For example, as described above with reference to FIGS. 3-7, an instance of an upgrade orchestrator 180 may be launched on a VC 120 of each host 100, and it may be used to determine what components of each host require upgrade. Alternatively, other methods may be implemented to launch an instance of the upgrade orchestrator on each host and determine what components of each host require upgrade.

At operation 1020, a VM of a host being upgraded makes a request to an upgrade service launched on a VM of a peer host of the cluster to orchestrate an upgrade of components of the host being upgraded while the VM is turned off. In implementations, this request may communicate information indicating the components of the host to be upgraded (e.g., VM, hypervisor, host BIOS/firmware, etc.) In some implementations, the upgrade service may be launched on the peer host on demand by the host being upgraded.

At operation 1030, the upgrade service running on the VM of the peer host may coordinate the upgrade of components of the host being upgraded while its VM is offline. At operation 1040, after the VM of the upgraded host powers on, it may validate that all steps of the upgrade completed successfully. After validation, if there are additional hosts on the cluster that require upgrade (decision 1050), at operation 1060, the VM of the upgraded host may a signal a VM of an additional host requiring upgrade to begin the upgrade process, and operations 1020-1050 may iterate.

Figure 11:
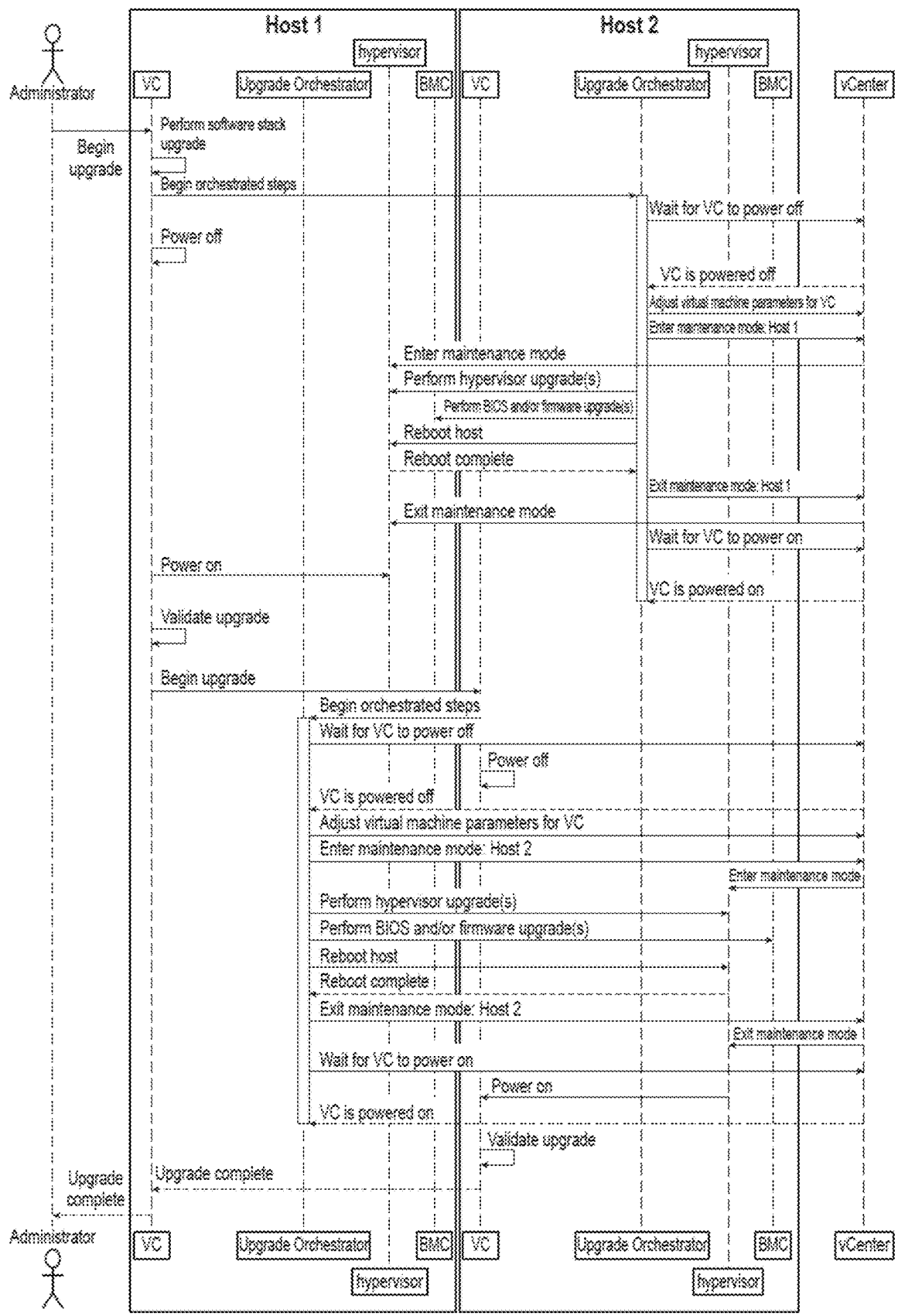
FIG. 11 is a sequence diagram illustrating an example method that may be implemented on a cluster of two hosts to initialize an upgrade orchestrator, and provide pre-upgrade component detection and validation, in accordance with implementations.

FIG. 11 is a sequence diagram illustrating an example method that may be implemented on a cluster of two hosts to initialize an upgrade orchestrator, and provide pre-upgrade component detection and validation, in accordance with implementations. In the example of FIG. 11, the VC of each host may be implemented as VC 120, the Upgrade Orchestrator of each host may be implemented as Upgrade Orchestrator 180, the hypervisor of each host may be implemented as hypervisor 110, the BMC may be implemented as BMC 102, and the vCenter may be implemented on a VM management server 170.

As illustrated in this example, an administrator may run an upgrade manager on a VM or physical computing system. A UI may ask the administrator questions about what versions to upgrade to and what hosts to upgrade. Alternatively, this may be predetermined (e.g., by a component detection and validation process as discussed above). The UI may be used to make an API call to a VC of host 1 to perform a software stack upgrade, and start an upgrade orchestrator on hosts 1 and 2.

The VC of host 1 may then communicate with an upgrade orchestrator of the VC of host 2 (e.g., through API) to coordinate the upgrade of host 1. The upgrade orchestrator of host 2 may wait for the VC of host 1 to power itself off. Once off, the upgrade orchestrator may adjust VM parameters. It may then communicate with the vCenter to cause the host 1 hypervisor to enter maintenance mode, which may shut down all VMs of host 1, including the VC. Once the host 1 hypervisor enters maintenance mode, the upgrade orchestrator may perform a hypervisor upgrade. Additionally, the upgrade orchestrator may perform BIOS and/or firmware upgrades of host 1 and cause host 1 to reboot. Once host 1 reboots, the upgrade orchestrator may communicate with the vCenter to cause the host 1 hypervisor to exit maintenance mode, which may cause the hypervisor to power back on all VMs, including the VC.

Once powered on, the VC of host 1 may validate the upgrade, and signal the VC of host 2 to begin the upgrade for host 2. Thereafter, the same upgrade steps discussed above for host being upgraded 1 may happen on host 2 with the upgrade orchestrator of host 1 driving the upgrade process of host 2.

It should be noted that although implementations described herein have been primarily described in the context of implementing upgrade services in virtualized environments, in some instances it may be advantageous to implement the disclosed techniques in environments that do not necessarily utilize virtualization or in environments that utilize virtualization but do not launch the upgrade service on a VM. For example, in some implementations the aforementioned process for coordinating the upgrade of a host using another networked machine may be performed by launching an upgrade service on a physical host, the physical host making a request to an upgrade service launched on another networked machine to coordinate the upgrade of components on the host, and the upgrade service of the another networked machine coordinating the upgrade of components of the host while one or more components of the host are powered off.

Figure 12:
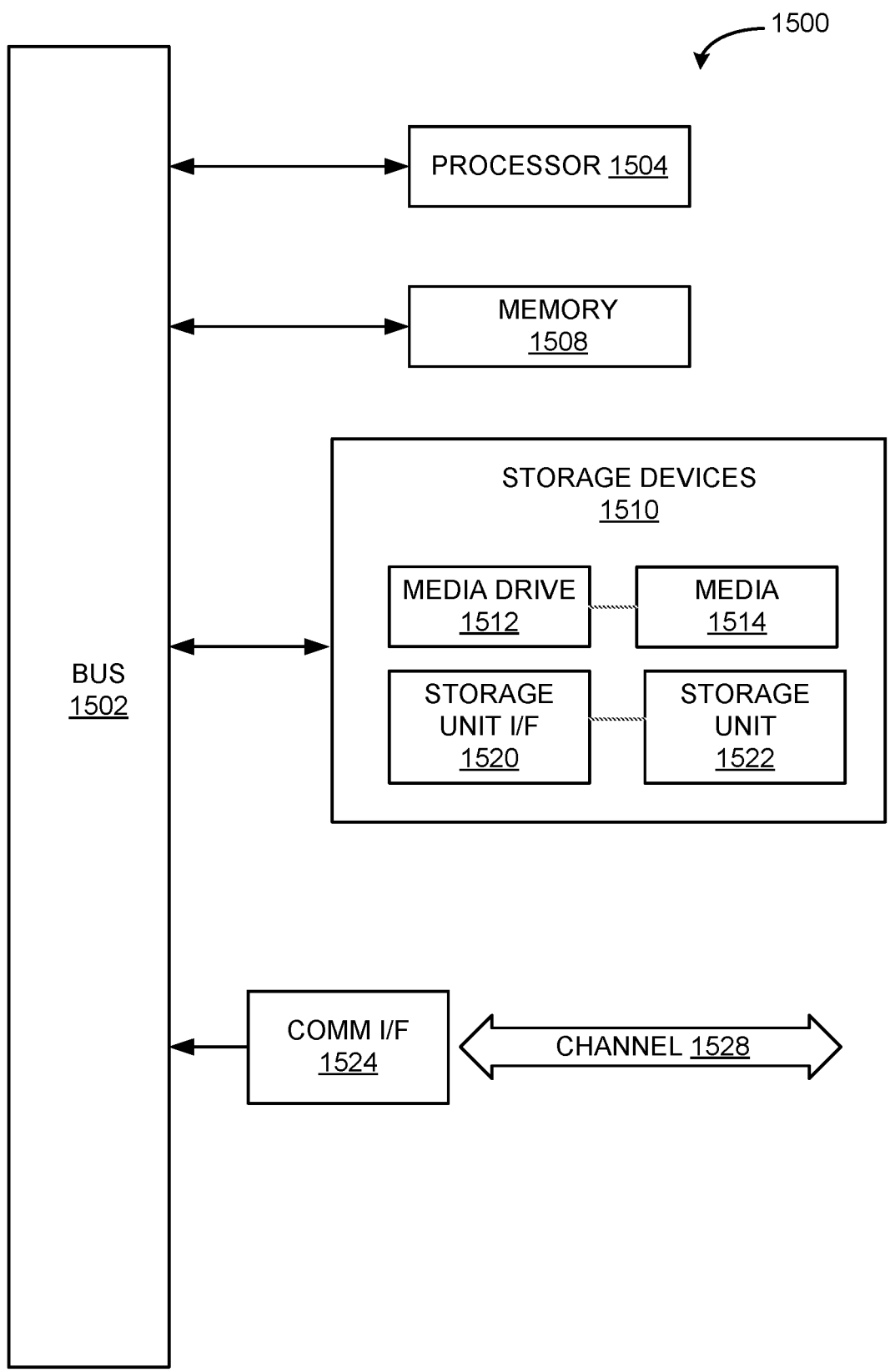
FIG. 12 is an example of a computing module that can be used in conjunction with various embodiments of the present disclosure.

FIG. 12 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module (e.g., a CPU) capable of carrying out the functionality described with respect thereto. One such example computing module is shown in FIG. 12. Various embodiments are described in terms of this example-computing module 1500. After reading this description, it will become apparent to a person skilled in the relevant art how to implement the application using other computing modules or architectures.

Referring now to FIG. 12, computing module 1500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1500 might include, for example, one or more processors, controllers, control modules, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing module 1500 or to communicate externally.

Computing module 1500 might also include one or more memory modules, simply referred to herein as main memory 1508. For example, preferably random access memory (RAM) or other dynamic memory, might be used for storing information and instructions to be executed by processor 1504. Main memory 1508 might also be used for storing temporary variables or other intermediate information during execution of instructions to be executed by processor 1504. Computing module 1500 might likewise include a read only memory ("ROM") or other static storage device coupled to bus 1502 for storing static information and instructions for processor 1504.

The computing module 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a solid state drive, an optical disk drive, a CD, DVD, or BLU-RAY drive (R or RW), or other removable or fixed media drive might be provided. Accordingly, storage media 1514 might include, for example, a hard disk, a solid state drive, cartridge, optical disk, a CD, a DVD, a BLU-RAY, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing module 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory module) and memory slot, a PCMCIA slot and card, and other fixed or removable storage units 1522 and interfaces 1520 that allow software and data to be transferred from the storage unit 1522 to computing module 1500.

Computing module 1500 might also include a communications interface 1524. Communications interface 1524 might be used to allow software and data to be transferred between computing module 1500 and external devices. Examples of communications interface 1524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1524 might typically be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 1508, storage unit 1522, and media 1514. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   uploading a software package to a virtual machine of a hypervisor of a host, the software package comprising an executable of an upgrade service, wherein the virtual machine comprises a virtual controller running storage stack software;
   launching the executable of the upgrade service on the virtual machine as part of an upgrade process, wherein the launched upgrade service initializes one or more application programming interfaces (APIs) that provide access to a component detection subsystem and a validation subsystem;
   using at least the component detection subsystem to determine and return a list of components that are upgradeable on the host by accessing one or more internal APIs of the virtual controller that provide more information than available through external APIs of the virtual controller;

receiving input from a user interacting with the upgrade process selecting one or more of the components of the list; and using at least the validation subsystem to perform compatibility testing of the one or more selected components of the list prior to upgrading the one or more selected components of the list.

2. The method of claim 1, wherein initializing the one or more APIs comprises: the launched upgrade service initializing an interface that registers itself into a HyperText Transfer Protocol (HTTP) or HTTP Secure (HTTPS) web server of the virtual machine with a new uniform resource identifier (URI) name space.

3. The method of claim 1, wherein using at least the component detection subsystem to determine and return the list of components that are upgradeable on the host, comprises:

contacting the one or more internal APIs of the virtual machine to determine a current version of the virtual machine; and comparing the current version of the virtual machine with a version of the virtual machine available for upgrade.

4. The method of claim 1, wherein the upgrade service includes an embedded HTTP/HTTPS server and wherein initializing the one or more APIs comprises: the launched upgrade service providing externally facing APIs without attaching to an existing HTTP/HTTPS webserver of the VM.

5. A non-transitory computer-readable medium having executable instructions stored thereon that, when executed by one or more processors, perform the operations of:

launching an instance of an upgrade service on a virtual machine of a host as part of an upgrade process;

initializing, by the upgrade service, one or more application programming interfaces (APIs) that provide access to a component detection subsystem and a validation subsystem;

using at least the component detection subsystem to determine and return a list of upgradeable components that are upgradeable on the host by accessing one or more internal APIs of the virtual machine that provide more information than available through external APIs of the virtual machine;

receiving input from a user interacting with the upgrade process selecting one or more of the upgradeable components of the list;

using at least the validation subsystem to perform compatibility testing of the selected components prior to upgrading the selected components on the host by performing a plurality of compatibility tests of the selected components including for each of the selected components, testing compatibility of an upgrade for the selected component with existing host software, host hardware, or another one of the selected components; and providing the user with an opportunity to review expectations regarding success or failure of upgrading the selected components by causing a plurality of validation test results to be presented to the user via a user interface based on the plurality of compatibility tests of the selected component.

6. The non-transitory computer-readable medium of claim 5, wherein initializing the one or more APIs comprises: the launched upgrade service initializing an interface that registers itself into a HyperText Transfer Protocol (HTTP) or HTTP Secure (HTTPS) web server of the virtual machine with a new uniform resource identifier (URI) name space.

7. The non-transitory computer-readable medium of claim 5, wherein using at least the component detection subsystem to determine and return the list of upgradeable components that are upgradeable on the host comprises:

contacting the one or more internal APIs of the virtual machine to determine a current version of the virtual machine; and comparing the current version of the virtual machine with a version of the virtual machine available for upgrade.

8. The non-transitory computer-readable medium of claim 5, wherein using at least the component detection subsystem to determine and return the list of upgradeable components that are upgradeable on the host comprises:

contacting a hypervisor running the virtual machine to determine a current version of the hypervisor; and comparing the current version of the hypervisor with a version of the hypervisor available for upgrade.

9. The non-transitory computer-readable medium of claim 5, wherein using at least the component detection subsystem to determine and return the list of upgradeable components that are upgradeable on the host comprises:

contacting a baseboard management controller (BMC) of the host to determine a current BIOS version or firmware version of the host; and comparing the current version of the BIOS or firmware with a version of the BIOS or firmware available for upgrade.

10. The non-transitory computer-readable medium of claim 5, wherein the instructions, when executed by the one or more processors, further perform the operations of:

launching a second instance of the upgrade service on a virtual machine of a second host;

using at least the component detection subsystem to determine and return a second list of upgradeable components that are upgradeable on the second host;

receiving input from the user selecting one or more of the upgradeable components of the second list, wherein the input from the user selecting one or more of the upgradeable components of the second list is received in parallel with the input from the user selecting one or more of the upgradeable components of the list; and using at least the validation subsystem to perform compatibility testing of the selected upgradeable components of the second list prior to upgrading the selected components of the second list.

11. The non-transitory computer-readable medium of claim 10, wherein the returned list of upgradeable components that are upgradeable on the host and the returned list of upgradeable components that are upgradeable on the second host are aggregated into an aggregated list and presented for selection to the user on the user interface, wherein the aggregated list displays a current version of each of the upgradeable components of the first and second lists, and an upgrade version available for each of the upgradeable components of the first and second lists.

12. The non-transitory computer-readable medium of claim 10, wherein the instructions, when executed by the one or more processors, further perform the operations of:

aggregating validation test results received from each of the first and second hosts based on the compatibility testing of the selected upgradeable components of each of the first and second hosts; and presenting the aggregated validation test results on the user interface to the user.

13. The non-transitory computer-readable medium of claim 12, wherein the presented aggregated validation test results include instructions for mitigating or correcting issues associated with a validation test result indicating expected failure or indicating a warning.

14. The non-transitory computer-readable medium of claim 5, wherein the virtual machine is a dedicated virtual machine of the host that runs storage stack software.

15. A system, comprising:
a plurality of components of a host including:
   a hypervisor;
   a Basic Input/Output System (BIOS) or firmware; and
   a virtual machine running on the hypervisor, wherein the virtual machine includes externally-facing application programming interface (APIs) and internal APIs, wherein the internal APIs provide more information for making a determination regarding availability of upgradable components of the plurality of components and compatibility of the upgradable components with an external environment of the virtual machine than is available via the externally-facing APIs;
a processing resource; and
a non-transitory computer-readable medium, coupled to the processing resource, having stored therein instructions of an upgrade service for performing an upgrade process, wherein the instructions when executed by the processing resource cause the processing resource to:
   initialize one or more application programming interfaces (APIs) that provide access to a component detection subsystem and a validation subsystem;
   use at least the component detection subsystem to determine and return a list of upgradeable components of the plurality of components that are upgradeable on the host by accessing the internal APIs;
   receive input from a user interacting with the upgrade process selecting one or more of the upgradeable components of the list;
   use at least the validation subsystem to perform compatibility testing of the selected components prior to upgrading the selected components on the host by performing a plurality of compatibility tests of the selected components including for each of the selected components, testing compatibility of an upgrade for the selected component with existing host software, host hardware, or another one of the selected components, wherein the plurality of compatibility tests provide information regarding expected success or failure of upgrading the selected components; and
   provide the user with an opportunity to review the expectations regarding success or failure of upgrading the selected components by causing a plurality of validation test results to be presented to the user via a user interface based on the plurality of compatibility tests of the selected component.

16. The system of claim 15, wherein initializing the one or more APIs comprises initializing an interface that registers itself into a HyperText Transfer Protocol (HTTP) or HTTP Secure (HTTPS) web server of the virtual machine with a new uniform resource identifier (URI) name space.

17. The system of claim 15, comprising a plurality of hosts, each of the plurality of hosts comprising a respective hypervisor and a virtual machine running on the respective hypervisor, wherein an instance of the upgrade service is launched on the virtual machine running on the respective hypervisor of the plurality of hosts to perform the operations of:
   initializing another set of one or more APIs on the virtual machine running on the respective hypervisor, another set of the one or more APIs providing access to the component detection subsystem and the validation subsystem;
   using at least the component detection subsystem to determine and return a list of components that are upgradeable on a host comprising the respective hypervisor on which the virtual machine runs;
   receiving user input selecting one or more of the components that are upgradeable on the host comprising the respective hypervisor on which the virtual machine runs; and
   using at least the validation subsystem to perform compatibility testing of the selected components of the host comprising the respective hypervisor on which the virtual machine runs prior to upgrading the selected components of the host comprising the respective hypervisor on which the virtual machine runs.

18. The system of claim 17, further comprising: an administrator system communicatively coupled to each of the plurality of hosts, wherein the administrator system is configured to:
   provide the user interface to:
      present an aggregated list of components that are upgradeable on each of the plurality of hosts;
      receive user input selecting one or more of the components of the aggregated list for each of the plurality of hosts; and
      present aggregated test results of compatibility testing of the components selected from the aggregated list for each of the plurality of hosts.

19. The system of claim 18, further comprising: a virtual machine management server, wherein, the administrator system communicates with each of the plurality of hosts using the virtual machine management server.

* * * * *